United States Patent [19]

Bühler et al.

[11] Patent Number: 5,415,669

[45] Date of Patent: May 16, 1995

[54] DYE MIXTURES FOR THE DYEING OF TEXTILE HYDROPHOBIC FIBRE MATERIALS

[75] Inventors: Ulrich Bühler, Alzenau; Hubert Kruse, Königstein; Erwin Dietz, Kelkheim, all of Germany

[73] Assignee: Hoechst Mitsubishi Kasei Co., Tokyo, Japan

[21] Appl. No.: 5,269

[22] Filed: Jan. 19, 1993

[30] Foreign Application Priority Data

Feb. 1, 1992 [DE] Germany .................. 42 02 911.2

[51] Int. Cl.⁶ ............................................. C09B 69/00
[52] U.S. Cl. ...................................... 8/644; 8/922
[58] Field of Search ................ 8/638, 644, 657, 922

[56] References Cited

U.S. PATENT DOCUMENTS

| | | | |
|---|---|---|---|
| 3,376,303 | 4/1968 | Fuchs et al. | 8/644 |
| 3,785,989 | 1/1974 | Noetzel et al. | 252/301.35 |
| 3,828,072 | 8/1974 | Spietschka et al. | 549/24 |
| 3,829,439 | 8/1974 | Spietschka et al. | 549/24 |
| 3,853,884 | 12/1974 | Troster | 8/179 |
| 4,116,926 | 9/1978 | Gattner et al. | 524/120 |
| 4,377,703 | 3/1983 | Elinkmann et al. | 549/24 |
| 4,443,226 | 4/1984 | Rohser | 8/532 |

FOREIGN PATENT DOCUMENTS

| | | |
|---|---|---|
| 0026463 | 4/1981 | European Pat. Off. |
| 0046250 | 2/1982 | European Pat. Off. |
| 1266076 | 5/1961 | France |
| 2367140 | 10/1977 | France |
| 1293939 | 3/1965 | Germany |
| 51-001778 | 1/1976 | Japan |
| 1589397 | 5/1981 | United Kingdom |

OTHER PUBLICATIONS

Chemical Abstracts, vol. 84, No. 24, Jun. 14, 1976, abstract no. 166255w.

Primary Examiner—Helene Klemanski
Attorney, Agent, or Firm—Connolly and Hutz

[57] ABSTRACT

The present invention relates to mixtures of dyes of the general formula I

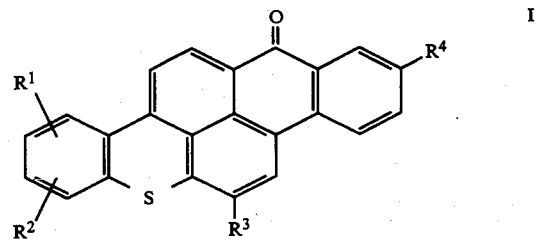

in which
$R^1$ is hydrogen, halogen, $(C_1–C_4)$-alkyl or $(C_1–C_4)$-alkoxy;
$R^2$ is hydrogen, halogen, cyano, $(C_1–C_4)$-alkyl, $(C_1–C_4)$-alkoxy, $(C_1–C_4)$-alkoxycarbonyl, $(C_1–C_4)$-alkylcarbonyloxy or phenyl, which may be substituted or unsubstituted;
$R^3$ is hydrogen, $(C_1–C_4)$-alkyl, $(C_1–C_4)$-alkoxy or phenyl, which may be substituted or unsubstituted; and
$R^4$ is hydrogen, halogen, $(C_1–C_4)$-alkoxy, phenylthio or phenoxy, which may be substituted or unsubstituted, to processes for their preparation and to the use of the dyes of the general formula I and their mixtures with one another for the dyeing and printing of textile hydrophobic synthetic fibre materials and blends thereof with natural fibre materials.

22 Claims, No Drawings

DYE MIXTURES FOR THE DYEING OF TEXTILE HYDROPHOBIC FIBRE MATERIALS

The present invention relates to mixtures of benzothioxanthene dyes, processes for their preparation and the use of benzothioxanthene dyes and their mixtures with one another for the dyeing and printing of textile hydrophobic synthetic fibre materials and blends thereof with natural fibre materials.

Benzothioxanthene dyes are known as fluorescent pigments for the dyeing of plastic materials such as, for example, polymethacrylates, polyvinyl chlorides, polyolefins, polycarbonates, polystyrenes, acrylonitrile, butadiene and styrene copolymers or even polyesters. They are described, for example, in FR 2,124,384, DE-A 2,613,493, DE-A 2,815,031, IT 1,061,813 and in Dyes and Pigment 3, 59 (1982). Their preparation is described in DE-B 2,134,517 and DE-B 2,134,518.

It is true that in DE-B 2,134,518 it is pointed out that compounds having a benzothioxanthene structure are known as disperse dyes, i.e. as dyes which must be present for dyeing in a dispersion. However, according to this prior art, benzothioxanthene dyes are only used for the mass colouration of polymers. In the case of polyester they can, if suitably substituted, also be incorporated in the polymer by condensation and then form a chemical bond to the polymer.

Surprisingly, it has now been found that benzothioxanthene dyes and in particular their mixtures with one another are also suitable for the dyeing and printing of textile hydrophobic fibre materials, in particular of polyester materials and blends thereof with natural fibre materials from an aqueous dye-bath or from a printing paste.

The present invention relates to mixtures of dyes of the general formula I

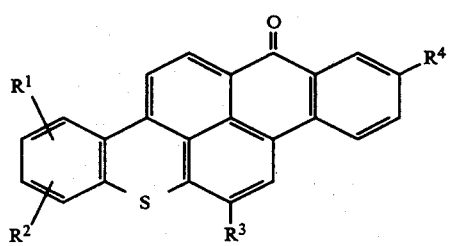

in which
$R^1$ is hydrogen, halogen, $(C_1-C_4)$-alkyl or $(C_1-C_4)$-alkoxy;
$R^2$ is hydrogen, halogen, cyano, $(C_1-C_4)$-alkyl, $(C_1-C_4)$-alkoxy, $(C_1-C_4)$-alkoxycarbonyl, $(C_1-C_4)$-alkylcarbonyloxy or phenyl, which may be substituted or unsubstituted;
$R^3$ is hydrogen, $(C_1-C_4)$-alkyl, $(C_1-C_4)$-alkoxy or phenyl, which may be substituted or unsubstituted; and
$R^4$ is hydrogen, halogen, $(C_1-C_4)$-alkoxy, phenylthio or phenoxy, which may be substituted or unsubstituted.

Preferred mixture components of the general formula I are those of the general formula Ia

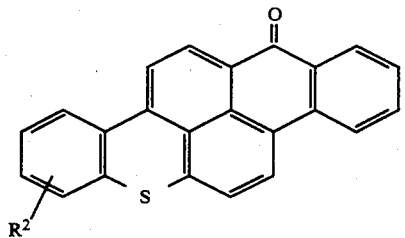

in which
$R^2$ is halogen, cyano, $(C_1-C_4)$-alkyl, $(C_1-C_4)$-alkoxy or $(C_1-C_4)$-alkoxycarbonyl;
those of the general formula Ib

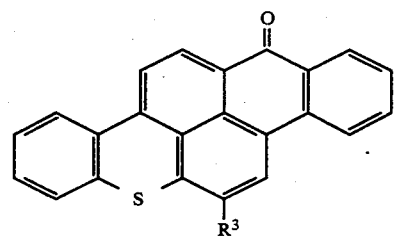

in which
$R^3$ is $(C_1-C_4)$-alkyl, $(C_1-C_4)$-alkoxy or phenyl;
those of the general formula Ic

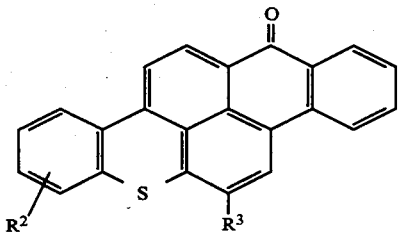

in which
$R^2$ is halogen, cyano, $(C_1-C_4)$-alkyl, $(C_1-C_4)$-alkoxy or $(C_1-C_4)$-alkoxycarbonyl; and
$R^3$ is $(C_1-C_4)$-alkoxy;
and those of the general formula Id

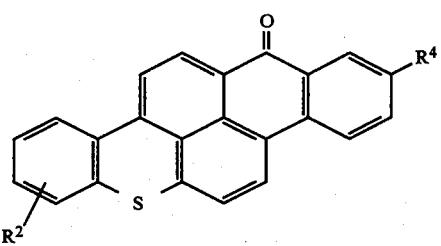

in which
$R^2$ is halogen, cyano, $(C_1-C_4)$-alkyl, $(C_1-C_4)$-alkoxy or $(C_1-C_4)$-alkoxycarbonyl and
$R^4$ is halogen, $(C_1-C_4)$-alkoxy, phenylthio or phenoxy, which may be substituted or unsubstituted.

Particularly preferred mixture components of the general formula I are those of the general formula Ie

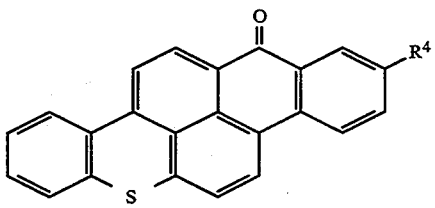

in which
R⁴ is (C₁–C₄)-alkoxy, phenylthio or phenoxy, which may be substituted or unsubstituted, phenylthio being preferred; and the compound of the formula If

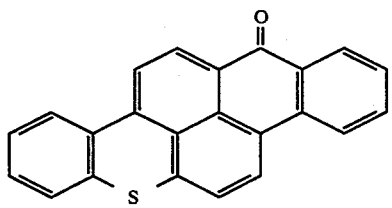

Examples of halogen as $R^1$, $R^2$ or $R^4$ are fluorine, chlorine or bromine, chlorine and bromine being preferred.

Examples of $(C_1-C_4)$-alkyl as $R^1$, $R^2$ or $R^3$ are methyl, ethyl, n-propyl, i-propyl, n-butyl, sec-butyl and i-butyl, methyl being preferred.

Examples of $(C_1-C_4)$-alkoxy as $R^1$, $R^2$, $R^3$ or $R^4$ are methoxy, ethoxy, n-propoxy, i-propoxy, n-butoxy, sec-butoxy and i-butoxy, methoxy being preferred. This applies analogously to $(C_1-C_4)$-alkoxycarbonyl as $R^2$.

Examples of $(C_1-C_4)$-alkylcarbonyloxy as $R^2$ are acetyloxy, propionyloxy, n-butyryloxy and i-butyryloxy.

Phenyl as $R^2$ or $R^3$ can be disubstituted or preferably monosubstituted, for example, by methyl, methoxy or chlorine.

Phenylthio or phenoxy as $R^4$ can be substituted, for example, by methyl, methoxy or chlorine.

Preferred mixtures according to the invention are those containing one or more dyes of the general formulae Ia and/or Ib and/or Ic and/or Id, in particular if their alkyl, alkoxy and halogen radicals have preferred meanings.

Particularly preferred mixtures according to the invention are those containing one or more dyes of the general formula Ie and/or the compound of the formula If.

The mixtures according to the invention preferably contain three or more mixture components of the general formula I. However, particularly preferably, they contain only two mixture components of the general formula I. In the dye mixtures according to the invention, the ratio of the various dyes of the general formula I can vary within relatively wide limits. In general, the minimum weight percentage of one component is 10% and the maximum weight percentage 90%. In the case of dye mixtures comprising only two dyes of the general formula I, a weight ratio of 70/30 to 30/70 is preferred, i.e. the weight percentage of one dye is 30 to 70%.

The present invention also relates to the use not only of the dye mixtures according to the invention but also of the dyes of the general formula I by themselves for the dyeing and printing of textile hydrophobic synthetic fibre materials and blends thereof with natural fibre materials. The dyes of the general formula I mentioned above as preferred or particularly preferred mixture components are also preferred or particularly preferred for the use according to the invention.

The dye mixtures or dyes according to the invention of the general formula I are formulated before dyeing, i.e. they are milled in suitable mills, such as, for example, ball or sand mills, in the presence of water and dispersants, and, if a pulverulent dyestuff formulation is to be prepared, subsequently spray-dried.

Examples of suitable dispersants are anionic or nonionic dispersants, which can also be used together.

Examples of anionic dispersants are condensation products of aromatic sulphonic acids with formaldehyde, in particular condensation products of alkylnaphthalenesulphonic acids with formaldehyde, condensation products of substituted or unsubstituted phenol with formaldehyde and sodium bisulphite, alkali metal salts of condensation products of substituted or unsubstituted phenol, naphthalene- or naphtholsulphonic acids, with formaldehyde and sodium bisulphite, alkali metal salts of condensation products of substituted or unsubstituted phenolsulphonic acids with formaldehyde and urea, and alkali metal salts of lignosulphonic acids; alkyl- or alkylarylsulphonates, and alkylarylpolyglycol ether sulphates.

Examples of nonionic dispersants or emulsifiers are reaction products of alkylene oxides, such as, for example, ethylene oxide or propylene oxide with alkylatable compounds, such as, for example, fatty alcohols, fatty amines, fatty acids, phenols, alkylphenols, arylalkylphenols, arylalkylarylphenols and carboxamides, such as, for example, adducts of 5 to 10 ethylene oxide units with $C_8-C_{10}$-alkylphenols.

Milling is carried out at temperatures of between 10° and 90° C. preferably at 30° to 60° C. When separately prepared individual components are formulated together, joint milling at temperatures of more than 30° C. is advantageous. This mechanically comminutes the dye particles to such an extent that an optimum specific surface area is achieved and sedimentation of the dye is kept at a minimum. The particle sizes of the dyes are in general between 0.5 and $5\mu$, preferably about $1\mu$.

The dye mixtures according to the invention can be prepared by various processes, for example by mixing the separately prepared individual dyes, it being preferred to mix already formulated individual dyes. This mixing process takes place in suitable mixers, such as, for example, tumble mixers or stirrers. However, separately formulated individual dyes can also be mixed by stirring them into dye liquors.

Furthermore, dye mixtures according to the invention can be prepared by formulating the separately prepared mixture components together, i.e. by joint milling and/or spray-drying. The joint milling process can also take place in dry form in the presence of salts or else in the presence of solvents, if appropriate at elevated temperature, in vibrating, ball or pearl mills.

Preferably, the dye mixtures according to the invention are prepared in a thermal treatment, which is characterised in that the individual dyes of the general formula I are heated together at temperatures of 50° to 150° C., preferably 90° to 130° C., if appropriate under pressure, in water for half an hour to several hours and cooled back down. This heating advantageously takes place in the presence of one or more dispersants or an organic solvent. Examples of such solvents are methanol, ethanol, dimethylformamide or dimethyl sulphoxide, but preferably solvents which have low solubility in water, such as toluene, chlorobenzene, 1,2-dichlorobenzene or butyl acetate. These solvents can again be distilled off after the thermal treatment. However, they can also be separated off by filtration and subsequent washing of the mixture with water. This preparation process can then be followed by the formulation of the mixture.

Particularly preferably, the dye mixtures according the invention are prepared by joint dissolution of the individual dyes of the general formula I in an organic solvent, solvent mixture or a mineral acid, followed by crystallisation and/or precipitation, isolation, for example by filtration and removal of solvent residues, for example by washing. In this case too, this can be followed by the formulation of the mixture.

Preferred organic solvents are polar protic solvents, such as dimethylformamide, dimethyl sulphoxide or N-methylpyrrolidone. It is advantageous to completely dissolve the mixture component. In the case of more sparingly soluble mixture components, this can be achieved by increasing the amount of solvent, the dissolution temperature or dissolution time. In order to save solvent, dissolution is advantageously carried out at elevated temperature, in which case temperatures of up to the boiling temperature of the particular solvent may be employed. If desired, the temperature can also be raised beyond that under pressure.

Examples of mineral acids which can be used as solvents are trifluoroacetic acid, hydrofluoric acid, polyphosphoric acid and in particular sulphuric acid. The sulphur dioxide and water content of the sulphuric acid should be such that, on the one hand, no sulphonation of the dyes takes place and, on the other, the dyes are still readily soluble.

A further particularly preferred preparation process comprises conjoint vatting and subsequent conjoint reoxidation of the individual dyes of the general formula I.

For certain areas of application, powder formulations are preferred. These powders contain the dye, dispersants and other auxiliaries, such as, for example, wetting and oxidising agents, preservatives and dust proofing agents.

A preferred preparation process for pulverulent dye preparations consists in removing the liquid from the liquid dye dispersions described above, for example by vacuum-drying, freeze-drying, drying on drum dryers, but preferably by spray-drying.

The dye contents of the liquid dye formulations are 20 to 40%, the dispersant contents about 20 to 40%. In the case of powder formulations, the dye contents are 20 to 60% and the dispersant contents 40 to 80%. For reasons of economy, the dye content does not drop below 20% in most cases.

The dyes of the general formula I to be used according to the invention and the dye mixtures according to the invention are highly suitable as such or else in a mixture with other disperse dyes for the dyeing and printing of textile hydrophobic synthetic fibre materials and blends thereof with natural fibre materials.

Examples of suitable hydrophobic synthetic materials are secondary cellulose acetate, cellulose triacetate, polyamides and in particular polyesters, such as, for example, polyethylene glycol terephthalate. Examples of natural fibre materials are cotton, regenerated cellulose fibres or wool.

The hydrophobic synthetic materials can be present in the form of sheet-like or filament-like structures and be processed, for example, to yarns or woven or knitted textile materials.

Dyeing of the fibre material mentioned using the dye according to the invention can take place in a manner known per se, preferably from an aqueous suspension, if appropriate in the presence of carriers, between 90° to about 110° C., by the exhaust method or by the HT process in a dyeing autoclave at 110° to 140° C., and by the so-called thermofix process, in which the material is padded with the dye liquor and then fixed at about 180° to 230° C. The mixtures according to the invention and the dyes of the general formula I are particularly suitable for the HT dyeing of polyester and polyester-containing textile materials in the pH range from 8 to 12.

Printing of the materials mentioned can be carried out in a manner known per se by incorporating the dye according to the invention in a printing paste and treating the material printed therewith, if appropriate in the presence of a carrier, at temperatures of between 90° and 230° C. with HT steam, pressurised steam or dry heat in order to fix the dye.

In this manner, brilliant orange to bluish red dyeings or prints of very high colour strength and very high brilliance and very good fastness properties, in particular a very high light fastness, are obtained. In the dyeing and padding liquors used in the above applications and in the printing pastes, the dye according to the invention should be present in as finely dispersed a form as possible. Fine dispersion of the dye is carried out in a manner known per se by stirring the formulated dye, if appropriate together with dyeing assistants, such as, for example, levelling agents, into the dyeing or padding liquor. To prepare the dye liquors, the required amounts of dye formulations prepared according to the details given above are diluted with the dyeing medium, preferably with water, to such an extent that a liquor ratio of 5:1 to 50:1 is obtained for dyeing. Additionally, further dyeing assistants, such as dispersants, wetting agents and fixing auxiliaries are in general added to the liquors. The pH is brought to 4 to 5, preferably 4.5, by addition of organic and inorganic acids, such as acetic acid, succinic acid, boric acid or phosphoric acid. It is advantageous to buffer the pH obtained and to add a sufficient amount of a buffer system. An example of an advantageous buffer system is the system acetic acid/sodium acetate.

If the dye is to be used for textile printing, the required amounts of dye formulations are kneaded in a known manner together with thickeners, such as, for example, alkali metal alginates or the like, and if desired, further additives, such as, for example, fixing accelerators, wetting agents and oxidising agents, to give printing pastes.

When the dyes of the formula I and their mixtures with one another are used for the dyeing of polyester or polyester-containing textile materials in an aqueous dyebath at a pH of between 8 and 12, the required pH of the dye liquor is adjusted before and/or during dyeing by the addition of bases, such as alkali metal hydroxides, for example aqueous sodium hydroxide solution, alkali metal bicarbonates, for example sodium bicarbonate or alkali metal carbonates, for example sodium carbonate. A preferred pH is 9 to 10.

In order to minimise variations in the pH, buffer substances are preferably added, such as described, for example, in JSDC 77 (1979) p. 47 or JSDC 79 (1981), p. 115. Particularly suitable buffer substances are those which have the greatest buffering effect in the pH range between 9 and 11. Examples of suitable buffer systems are acetic acid/sodium pyrophosphate, boric acid/borax, sodium dihydrogen phosphate/disodium hydrogen phosphate, phosphoric acid/succinic acid/boric acid or combinations of organic phosphorus compounds with polycarboxylic acids. The amounts used of the buffer system are preferably between 0.5 and 10 g/l.

The invention is illustrated by the examples which follow:

EXAMPLE 1

20 g of the dye of the formula Ig

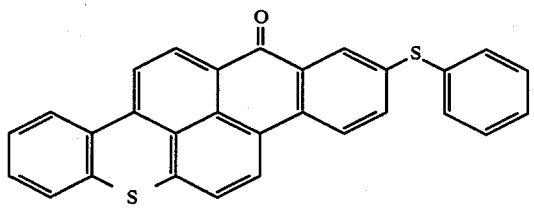

and 20 g of the dye of the formula If

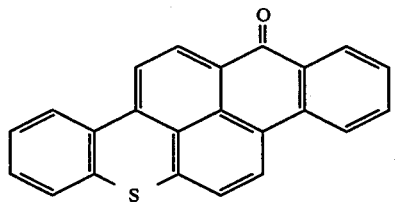

are stirred in 1.2 l of N-methylpyrrolidone at 115° C. for 1 hour, the mixture is cooled to 50° C. and poured into 8 l of water in order to precipitate the product. The suspension is then heated to 80° C., filtered, the product is washed with water and dried, giving 38.2 g of dye mixture.

0.3 g of the dye mixture thus obtained is stirred in finely dispersed form into 2000 g of water. The dispersion is brought to a pH of 4.5 with acetic acid and sodium acetate, and 2.0 g of a commercially available dispersant based on a naphthalenesulphonic acid/formaldehyde condensation product are added.

The dye liquor thus obtained is entered with 100 g of a polyester fabric based on polyethylene glycol terephthalate, and the fabric is dyed at 130° C. for 45 minutes. Subsequent rinsing, reductive aftertreatment using a 0.2% sodium dithionite solution at 70° to 80° C. for 15 minutes, rinsing and drying give a brilliant red dyeing having very good colouristic fastness properties, in particular a very good light fastness.

EXAMPLE 2

7.5 g each of the dyes used in Example 1 are suspended in 250 ml of water with 45 g of a sodium lignosulphonate and 10 g of a nonionic dispersant based on arylpolyglycol ether, the mixture is brought to a pH of 6 with acetic acid, and, after homogenisation using a toothed-blade stirrer, heated in an autoclave at 100° C. for 2 hours. The mixture is then cooled, milled, after addition of 30 g of a condensation product of cresol with formaldehyde and sodium naphthol-2-sulphonate, to a fine dispersion of 80%≦1μ, screened and spray-dried.

If polyester is dyed with 2 g of the powder thus obtained, as described in Example 1, a brilliant red dyeing having excellent colouristic fastness properties is likewise obtained.

EXAMPLE 3

20 g of the dye of the formula Ig are milled in 150 ml of water in the presence of 30 g of sodium lignosulphonate in a sand mill to a particle size distribution of 80%≦1μ and screened. 150 g of the dispersion thus obtained are incorporated in 1000 g of a printing paste containing 45 g of carob-seed flour, 6 g of sodium 3-nitrobenzenesulphonate and 3 g of citric acid per 100 g. If a polyester fabric is printed using this printing paste, the printed fabric is after drying steamed at a steam pressure of 1.5 atmospheres gauge for 15 minutes, soaped and dried, a brilliant bluish red print having excellent colouristic fastness properties is obtained.

EXAMPLE 4

100 g of a polyethylene terephthalate fabric is dyed in a dyeing autoclave with 2 g of the liquid preparation prepared by the procedure of Example 3 in a dye liquor comprising 2 l of water, 2 g of a dyeing assistant based on a formaldehyde condensation product and 5 g of a buffer substance which is a mixture of an organic phosphorus compound and a polycarboxylic acid at 130° C. for 45 minutes, after the pH of the dye liquor had previously been brought to 9.5 with aqueous sodium hydroxide solution. The dyeing is then rinsed, reduction cleared, and rinsed and dried. In this manner, a brilliant yellowish red dyeing is obtained. Dyeing is repeated, now adding 4 g of sodium acetate as the buffer substance and bringing the pH of the dye liquor to 4.5 with acetic acid. The resulting dyeing serves as a reference for comparison with the dyeing obtained at pH 9.5: both dyeings have virtually the same hue, i.e. the dye has virtually not decomposed at pH 9.5.

In the table below, further mixtures according to the invention and dyes to be used according to the invention are listed, which produce likewise brilliant red dyeings and prints on polyester having likewise very good colour properties.

Abbreviations:

1=brilliant bluish red
2=brilliant red
3=brilliant yellowish red

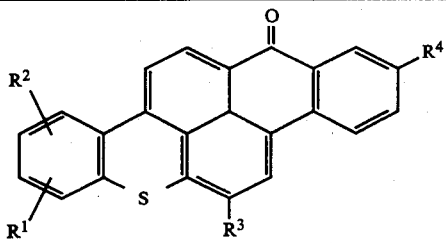

| R¹ | R² | R³ | R⁴ | Mixing ratio | Hue on PES |
|---|---|---|---|---|---|
| H | H | H | H | 30 | 1-2 |
| H | H | H | SC₆H₅ | 70 | |
| H | H | H | H | 80 | 2-3 |
| H | H | H | SC₆H₅ | 20 | |
| H | H | H | S(4-Cl—)C₆H₄ | 40 | 2 |
| H | H | H | H | 60 | |
| H | H | H | S(3.5-Di—CH₃)C₆H₃ | 65 | 1 |
| H | H | H | H | 35 | |
| 3-CH₃ | H | H | S(3.5-Di—CH₃)C₆H₃ | 50 | 1-2 |
| H | H | H | H | 50 | |
| H | H | H | SC₆H₅ | 90 | 1 |
| 3-OCH₃ | H | H | H | 10 | |
| H | H | H | SC₆H₅ | 55 | 2 |
| H | H | H | Br | 45 | |
| H | H | H | SC₆H₅ | 5 | 3 |
| H | H | CH₃ | H | 95 | |
| H | H | H | SC₆H₅ | 30 | 2 |
| 3-CH₃ | H | H | H | 70 | |
| H | H | H | SC₆H₅ | 95 | 1 |
| 2-CH₃ | H | H | H | 5 | |
| H | H | H | SC₆H₅ | 50 | 2 |
| 3-Cl | H | H | H | 50 | |
| H | H | H | SC₆H₅ | 65 | 1-2 |
| 2-Cl | 4-CH₃ | H | H | 35 | |
| H | H | H | S(4-CH₃—)C₆H₄ | 20 | 2 |
| 3-OCH₃ | H | H | H | 80 | |
| H | H | H | S(4-OCH₃—)C₆H₄ | 99 | 1 |
| 3-C₂H₅ | H | H | H | 1 | |
| H | H | H | SC₆H₅ | 67 | 1 |
| H | H | H | S(3.5-Di—CH₃—)C₆H₃ | 33 | |
| H | H | H | SC₆H₅ | 80 | 1 |
| H | H | H | S(4-Cl—)C₆H₄ | 20 | |
| 3-CH₃ | H | H | SC₆H₅ | 15 | 1 |
| H | H | H | S(3-CH₃—)C₆H₄ | 85 | |
| H | H | H | H | 70 | 3 |
| H | H | OCH₃ | H | 30 | |
| H | H | H | H | 30 | 2-3 |
| H | H | OnC₄H₉ | H | 70 | |
| H | H | H | H | 50 | 3 |
| H | H | CH₃ | H | 50 | |
| H | H | H | H | 90 | 2-3 |
| 2-CH₃ | H | OCH₃ | H | 10 | |
| H | H | H | H | 33 | 3 |
| 3-CH₃ | H | H | H | 67 | |
| H | H | H | H | 85 | 3 |
| H | H | C₆H₅ | H | 15 | |
| H | H | H | H | 20 | 2-3 |
| 3-OC₂H₅ | H | H | H | 80 | |
| H | H | H | H | 30 | 2 |
| 2-OC₂H₅ | H | OCH₃ | H | 70 | |
| H | H | H | H | 30 | 3 |
| 3-Cl | H | H | H | 70 | |
| H | H | H | H | 60 | 3 |
| 2-CH₃ | 3-CH₃ | H | H | 40 | |
| H | H | H | H | 50 | 3 |
| 2-Cl | 4-CH₃ | OCH₃ | H | 50 | |
| 2-CH₃ | H | H | H | 95 | 3 |
| 3-CH₃ | H | H | H | 5 | |
| 3-CH₃ | H | H | H | 45 | 3 |
| H | H | CH₃ | H | 55 | |
| H | H | H | OC₆H₅ | 30 | 2-3 |
| H | H | H | H | 70 | |
| H | H | H | O(4-Cl—)C₆H₄ | 10 | 3 |
| H | H | H | H | 90 | |
| H | H | H | O(4-CH₃—)C₆H₄ | 80 | 2 |
| H | H | H | H | 20 | |
| H | H | H | O(2-Cl-4-CH₃—)C₆H₃ | 30 | 2-3 |
| H | H | H | H | 70 | |
| H | H | H | OC₆H₅ | 50 | 2-3 |

-continued

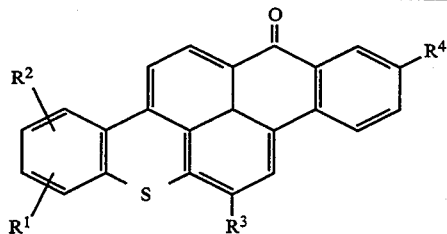

| $R^1$ | $R^2$ | $R^3$ | $R^4$ | Mixing ratio | Hue on PES |
|---|---|---|---|---|---|
| 3-CH$_3$ | H | H | H | 50 | |
| H | H | H | O(2-CH$_3$—)C$_6$H$_4$ | 10 | 2–3 |
| H | H | OCH$_3$ | H | 90 | |
| 3-CH$_3$ | H | H | OC$_6$H$_5$ | 20 | 2–3 |
| H | H | H | H | 80 | |
| H | H | H | SC$_6$H$_5$ | 70 | 1–2 |
| H | H | H | OC$_6$H$_5$ | 30 | |
| H | H | H | SC$_6$H$_5$ | 80 | 1–2 |
| H | H | H | Br | 20 | |
| H | H | H | OC$_6$H$_5$ | 90 | 2 |
| H | H | H | Br | 10 | |
| H | H | H | OC$_6$H$_5$ | 50 | 2 |
| 2-OC$_2$H$_5$ | H | H | H | 50 | |
| H | H | H | OCH$_3$ | 30 | 2–3 |
| H | H | H | H | 70 | |
| H | H | H | OCH$_3$ | 50 | 2 |
| 2-OCH$_3$ | H | H | H | 50 | |
| H | H | H | OC$_2$H$_5$ | 60 | 2 |
| H | H | H | Br | 40 | |
| H | H | H | OnC$_4$H$_9$ | 90 | 2 |
| H | H | H | H | 10 | |
| H | H | H | OC$_2$H$_5$ | 45 | 1–2 |
| H | H | H | OC$_6$H$_5$ | 55 | |
| H | H | H | OCH$_3$ | 10 | 1–2 |
| H | H | H | SC$_6$H$_5$ | 90 | |
| H | H | H | H | 80 | 2–3 |
| 2-CH$_3$ | H | H | H | 10 | |
| H | H | H | Br | 10 | |
| H | H | H | OC$_6$H$_5$ | 30 | 1 |
| H | H | H | SC$_6$H$_5$ | 30 | |
| H | H | H | OCH$_3$ | 40 | |
| H | H | H | OC$_6$H$_5$ | 40 | 2 |
| H | H | H | OC$_2$H$_5$ | 40 | |
| H | H | H | Br | 20 | |
| H | H | H | H | 8 | 2–3 |
| H | H | OCH$_3$ | H | 90 | |
| H | H | H | OCH$_3$ | 2 | |
| H | H | H | H | | 3 |
| H | H | H | Br | | 3 |
| H | H | iC$_3$H$_7$ | H | | 3 |
| 3-OCH$_3$ | H | H | H | | 2 |
| 3-CH$_3$ | H | H | H | | 3 |
| 3-CH$_3$ | H | H | Br | | 3 |
| H | H | H | SC$_6$H$_5$ | | 1 |
| H | H | H | S(3.5-Di—CH$_3$—)C$_6$H$_3$ | | 1 |
| H | H | H | S(4-Cl—)C$_6$H$_4$ | | 2 |
| H | H | H | S(4-Cl-2.5-Di—CH$_3$—)C$_6$H$_2$ | | 2 |
| 3-CH$_3$ | H | H | S(4-Cl-2.5-Di—CH$_3$—)C$_6$H$_2$ | | 1 |
| 3-CH$_3$ | H | H | S(3.5-Di—CH$_3$—)C$_6$H$_3$ | | 1 |
| H | H | OCH$_3$ | H | | 2 |
| H | H | CH$_3$ | H | | 3 |
| 2-CH$_3$ | H | OCH$_3$ | H | | 2 |
| 2-CH$_3$ | 3-CH$_3$ | H | H | | 3 |
| 2-Cl | 4-CH$_3$ | H | H | | 3 |
| H | H | H | OC$_6$H$_5$ | | 2 |
| 3-CH$_3$ | H | H | OC$_6$H$_5$ | | 2 |
| H | H | H | O(3-CH$_3$)C$_6$H$_4$ | | 2 |
| H | H | H | OnC$_3$H$_7$ | | 2 |
| H | H | H | OCH$_3$ | | 2 |
| 3-CH$_3$ | H | H | OC$_2$H$_5$ | | 2 |
| 3-OCH$_3$ | H | H | OC$_6$H$_5$ | | 1–2 |
| 2-CH$_3$ | H | H | OC$_6$H$_5$ | | 2 |
| 2-CH$_3$ | 3-CH$_3$ | H | OnC$_4$H$_9$ | | 2 |

We claim:
1. Mixture of dyes of the general formula I

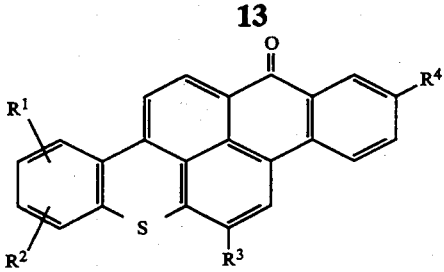

in which
- R¹ is hydrogen, halogen, $(C_1-C_4)$-alkyl or $(C_1-C_4)$-alkoxy;
- R² is hydrogen, halogen, cyano, $(C_1-C_4)$-alkyl, $(C_1-C_4)$-alkoxy, $(C_1-C_4)$-alkoxycarbonyl, $(C_1-C_4)$-alkylcarbonyloxy or phenyl, which is substituted or unsubstituted;
- R³ is hydrogen, $(C_1-C_4)$-alkyl, $(C_1-C_4)$-alkoxy or phenyl, which is substituted or unsubstituted; and
- R⁴ is hydrogen, halogen, $(C_1-C_4)$-alkoxy, phenylthio which may be substituted or unsubstituted or phenoxy, which may be substituted or unsubstituted.

2. The mixture according to claim 1, wherein the halogen of R¹, R², and R⁴ is selected from the group consisting of fluorine, chlorine and bromine.

3. The mixture according to claim 2, wherein the halogen is chlorine or bromine.

4. The mixture according to claim 1, wherein the $(C_1-C_4)$-alkyl in R¹, R² and R³ is the same or different and are selected from the group consisting of methyl, ethyl, n-propyl, i-propyl, n-butyl, sec-butyl and i-butyl.

5. The mixture according to claim 4, wherein the $(C_1-C_4)$-alkyl is either i-butyl or methyl.

6. The mixture according to claim 1, wherein $(C_1-C_4)$-alkoxy in R¹, R², R³ and R⁴ is selected from the group consisting of methoxy, ethoxy, n-propoxy, i-propoxy, n-butoxy, sec-butoxy and i-butoxy.

7. The mixture according to claim 6, wherein $(C_1-C_4)$-alkox7 is either i-butoxy or methoxy.

8. The mixture according to claim 1, wherein the $(C_1-C_4)$-alkylcarbonyloxy in R² is selected from the group consisting of acetyloxy, propionyloxy, n-butyryloxy and i-butyryloxy.

9. The mixture according to claim 1, wherein the phenyl in R² and R³ is disubstituted or monosubstituted.

10. The mixture according to claim 9, wherein the phenyl is monosubstituted.

11. The mixture according to claim 10, wherein the phenyl is monosubstituted with a substituent selected from the group consisting of methyl methoxy and chlorine.

12. The mixtures according to claim 1, comprising one or more dyes of the general formula (Ia)

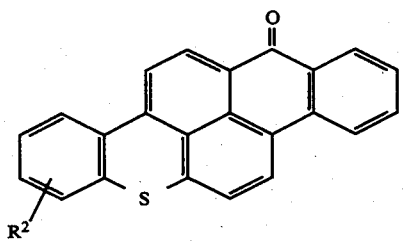

in which

R² is halogen, cyano, $(C_1-C_4)$-alkyl, $(C_1-C_4)$-alkoxy or $(C_1-C_4)$-alkoxycarbonyl; and/or of the general formula (Ib)

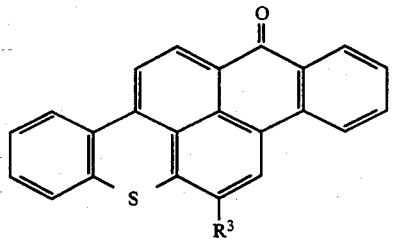

in which
R³ is $(C_1-C_4)$-alkyl, $(C_1-C_4)$-alkoxy or phenyl;
and/or of the general formula (Ic)

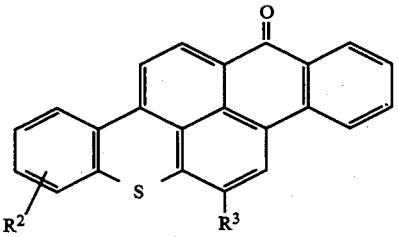

in which
R² is halogen, cyano, $(C_1-C_4)$-alkyl, $(C_1-C_4)$-alkoxy or $(C_1-C_4)$-alkoxycarbonyl and
R³ is $(C_1-C_4)$-alkoxy;
and/or of the general formula (Id)

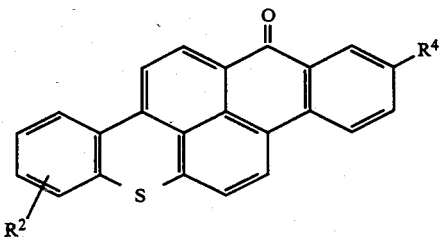

in which
R² is halogen, cyano, $(C_1-C_4)$-alkyl, $(C_1-C_4)$-alkoxy or $(C_1-C_4)$-alkoxycarbonyl and
R⁴ is halogen, $(C_1-C_4)$-alkoxy, phenylthio or phenoxy, which may be substituted or unsubstituted.

13. Mixtures according to claim 1, wherein there are one or more dyes of the general formula (Ie)

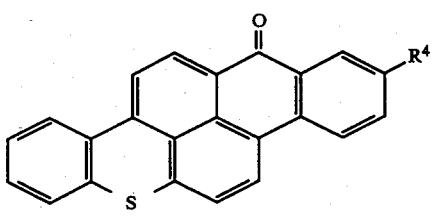

in which
R⁴ is $(C_1-C_4)$-alkoxy, phenylthio or phenoxy, which is substituted or unsubstituted, and/or the compound of the formula (If)

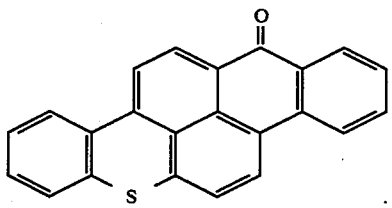
(If)

14. The mixtures according to claim 12, wherein $R^4$ is phenylthio.

15. The mixtures according to of claim 1, comprising at least two dye components of the general formula I.

16. The mixtures according to claim 13, comprising at least one or more dyes of the group selected from (Ie) and (If) or a mixture thereof.

17. Process for the preparation of the mixtures according to claim 1, comprising:
   a) mixing the separately prepared and, formulated individual dyes of the general formula I
   b) stirring the separately prepared and formulated individual dyes of the general formula I into a dye liquor or
   c) formulating the separately prepared individual dyes of the general formula I together.

18. Process for the preparation of the mixtures according to claim 1, comprising heating the individual dyes of the general formula I together at temperatures of 50° to 150° C., optionally under pressure, in water for half and hour to several hours and cooling back down, optionally followed by formulating of the mixture.

19. Process for the preparation of the mixtures according claim 1 comprising dissolving the individual dyes of the general formula I together in an organic solvent, solvent mixture or a mineral acid, followed by crystallizing and/or precipitating, isolating and, the formulating of the mixture.

20. Process for the preparation of the mixtures according to claim 1, comprising subjecting the individual dyes of the general formula I to conjoint vatting and subsequent conjoint reoxidation.

21. Dyeing and printing of textile hydrophobic synthetic fibre materials and blends thereof with natural fibre materials comprising applying the mixture as claimed in claim 1 to the fibre materials.

22. Dyeing and printing of textile hydrophobic synthetic fibre materials as claimed in claim 21, wherein the fibre materials consist of polyester or polyester-containing textile materials and are dyed by the HT dyeing process in the pH range from 8 to 12.

* * * * *